United States Patent [19]

Best

[11] 4,168,396
[45] Sep. 18, 1979

[54] MICROPROCESSOR FOR EXECUTING ENCIPHERED PROGRAMS

[76] Inventor: Robert M. Best, 16016 9th Ave. NE., Seattle, Wash. 98155

[21] Appl. No.: 846,638

[22] Filed: Oct. 31, 1977

[51] Int. Cl.² .............................................. H04L 9/00
[52] U.S. Cl. .................................. 178/22; 364/200; 364/900
[58] Field of Search ............... 178/22; 364/200, 900; 200/61.08; 339/19, 37, 39; 174/52 PE; 340/147 MD

[56] References Cited

U.S. PATENT DOCUMENTS

| | | |
|---|---|---|
| 3,504,132 | 3/1970 | Wallace, Jr. ............... 174/52 PE |
| 3,798,359 | 3/1974 | Feistel ................................ 340/348 |
| 3,911,216 | 10/1975 | Bartek et al. ...................... 178/22 |
| 3,944,976 | 3/1976 | France ........................... 340/149 A |
| 3,958,081 | 5/1976 | Ehrsam et al. ...................... 178/22 |
| 4,037,215 | 7/1977 | Birney et al. ..................... 364/200 |
| 4,074,066 | 2/1978 | Ehrsam et al. ...................... 178/22 |
| 4,120,030 | 10/1978 | Johnstone ............................ 178/22 |

OTHER PUBLICATIONS

Motorola DES 3100NSM Network Security Module Preview (Brochure), Feb. 16, 1979.
Hard-Node (Brochure), Complan, Computation Planning, Inc., Mar. 28, 1977.

Primary Examiner—S. C. Buczinski
Attorney, Agent, or Firm—Seed, Berry, Vernon & Baynham

[57] ABSTRACT

A microprocessor for executing computer programs which have been enciphered during manufacture to deter the execution of the programs in unauthorized computers. This microprocessor deciphers and executes an enciphered program one instruction at a time, through a combination of substitutions, transpositions, and exclusive-OR additions, in which the address of each instruction is combined with the instruction. Each unit may use a unique set of substitutions so that a program that can be executed in one microprocessor can not be run in any other microprocessor.

53 Claims, 5 Drawing Figures

MICROPROCESSOR FOR EXECUTING ENCIPHERED PROGRAMS

BACKGROUND OF THE INVENTION

The development of computer programs for microcomputers is often an expensive and time-consuming enterprise. To recover the development cost of such programs it is important to the developer that each user pay for the programs he uses. This is often difficult to accomplish in practice, because it is generally easy for users to make multiple copies of the programs for non-paying users, and easy for competitors to repackage and distribute valuable programs at a fraction of the original developer's cost. The development of highly human-engineered systems which can be used by unskilled microcomputer owners has been inhibited by the realization that a market price high enough to cover costs will also be high enough to attract pirating and covert distribution of unauthorized copies. This problem is made worse by the fact that microcomputers are inexpensive lightweight devices which can be taken apart and analyzed in secret by their owners who may be numerous and anonymous.

Microcomputers generally contain one or more integrated circuit microprocessors that execute the program instructions one byte at a time. (A byte is usually 8 bits or 16 bits but other byte sizes may be used in the present invention). These microprocessors are usually interchangeable stock components which are available from many vendors. This interchangeability makes it easy for a competitor to plagiarize proprietary programs by using similar but unauthorized microprocessors. One method of preventing such theft of proprietary programs is to alter each microprocessor and the programs which accompany it so that neither the microprocessors nor the programs are interchangeable. This can be accomplished by enciphering each program in a different cipher so that each program can be deciphered and executed only by the authorized microprocessor that accompanies it in the microcomputer. The main disadvantages of this approach are that prior-art encryption methods are either not sufficiently secure against cryptanalyst attack, or require too much space on the microprocessor chip, and/or are too slow when used for this purpose. The following prior-art encryption methods have one or more of these disadvantages.

Block cipher systems have been developed for protecting digital information during transmission over communication networks. Some of these systems are extremely secure and are suitable for such data as financial transactions which must be immune from cryptanalyst attack. One method of providing such high security is to use alternating substitution and transportion as described in "Communication Theory of Secrecy Systems" by C. E. Shannon, Bell System Technical Journal, Vol. 28, pages 711-713, October 1949. Further teachings on such block cipher systems may be found in "Cryptography and Computer Privacy" by Horst Feistel, Scientific American, Vol. 228, No. 5, pages 15-23, May 1973. Several inventions have made use of these teachings, for example the systems disclosed in U.S. Pat. Nos. 3,789,359 and 3,958,081 issued Mar. 19, 1974 and May 18, 1976 respectively. These block cipher systems are suitable for protecting valuable software used in microprocessors as disclosed in copending application Ser. No. 750,009 filed Dec. 13, 1976, now abandoned. A deciphering processor using such a block cipher is highly secure, but is complex, costly and slow for the kind of microcomputers contemplated for use with the present invention.

Simple low-cost stream cipher systems are frequently used for enciphering digital communications data by combining in various ways the message being transmitted with a long stream of quasi-random bits. This stream of bits is generated by a random number generator from a cipher key or "seed". An example of such a system may be found in U.S. Pat. No. 3,911,216 issued Oct. 7, 1975. If a stream cipher method were used to protect microcomputer programs, the deciphering circuitry would not be able to decipher the whole program as a long stream and then execute it, because space limitations prevent the whole deciphered program from being stored on the microprocessor chip. Storing it external to the microprocessor is futile, because the wiring of the microcomputer is accessible to users. Deciphering the program as it executes is not practical either (using a stream chiper), because programs do not generally execute and address data in a strict address sequence, but instead contain many loops and jumps. Hence a program enciphered in address sequence cannot be deciphered as a stream. To recompute a portion of the random bit stream every time the address sequence changed would be a slow process, and would be prohibitively slow if different portions of the random bit stream had to be recomputed for each instruction executed. For these reasons such stream ciphers are not practical for protecting programs which are deciphered as they are executed in a microprocessor.

Another prior-art encryption method is monoalphabetic substitution. In such a system each byte of the program would be replaced with a substitute byte. Each byte of the enciphered program would be deciphered when needed by a simple table-lookup using a small substitution table which is part of the circuitry on the microprocessor chip. This method has several advantages: it is simple, fast, does not take too much space on the chip, and may proceed in any instruction sequence. Unfortunately, monoalphabetic substitution is not difficult to break, and hence offers little security for the program.

Other prior-art encryption methods share one or more of the disadvantages already mentioned. Hence the prior art does not provide a secure cryptographic system which is suitable for protecting programs which are deciphered one byte at a time as the program executes, by an inexpensive single-chip microprocessor in a computer with easily accessible wiring.

SUMMARY OF THE INVENTION

The primary objects of this invention are:
1. to deter users of microcomputer programs from executing the programs in unauthorized computers;
2. to make the deciphering process as simple and as inexpensive as possible, consistent with good security of the enciphered programs;
3. to decipher each byte of an instruction in one clock cycle, so that deciphering can proceed as fast as execution; and
4. to provide cryptographic methods which have the advantages of monoalphabetic substitution, but are much more secure.

These and other objects of the invention are accomplished through the use of a microprocessor constructed as an integrated-circuit chip (FIG. 4) or hybrid circuit (FIG. 5). This microprocessor includes conventional processing circuits for executing instructions and circuitry for deciphering enciphered information through a series of bit-transpositions, byte-substitutions and exclusive-OR (modulo-2) additions. Each enciphered byte is separately deciphered by combining it with its address. Several such combining methods are herein disclosed. The purpose of making each cipher a function of its address is to avoid the weaknesses of monoalphabetic substitution and the slowness of a block cipher.

Prior-art inventions based on the teachings of Feistel previously referenced are complex and slow because they require the use of a variable cipher key, publicly known substitution functions, and many transposition and substitution steps. A different approach is used in the present invention. Since the microprocessor will be used only with the enciphered programs which are authorized for it, a variable key is not essential. Since different substitution functions will be used for each software system or perhaps each unit, the details of the substitution functions may be kept secret, even though the general design is publicly known. By using the system design herein disclosed, the deciphering step can be done in one clock cycle, so that execution is not slowed by the deciphering process.

The objectives of this invention are achieved by making the task of breaking the cipher or otherwise obtaining the deciphered program, more difficult and expensive than recoding the program from scratch. The cryptographic systems disclosed herein are sufficiently difficult to break and have the important advantages of being simple, inexpensive, and fast.

GENERAL DESCRIPTION OF THE DISCLOSED EMBODIMENTS

This invention consists of a microprocessor apparatus and cryptographic methods. The methods disclosed are used in the microprocessor apparatus, but are not limited to microprocessors. Two embodiments of the apparatus are disclosed. The first embodiment is preferred for simplicity if enciphering of output data is not required. If enciphering is required, the second embodiment is preferred.

Figure 1:
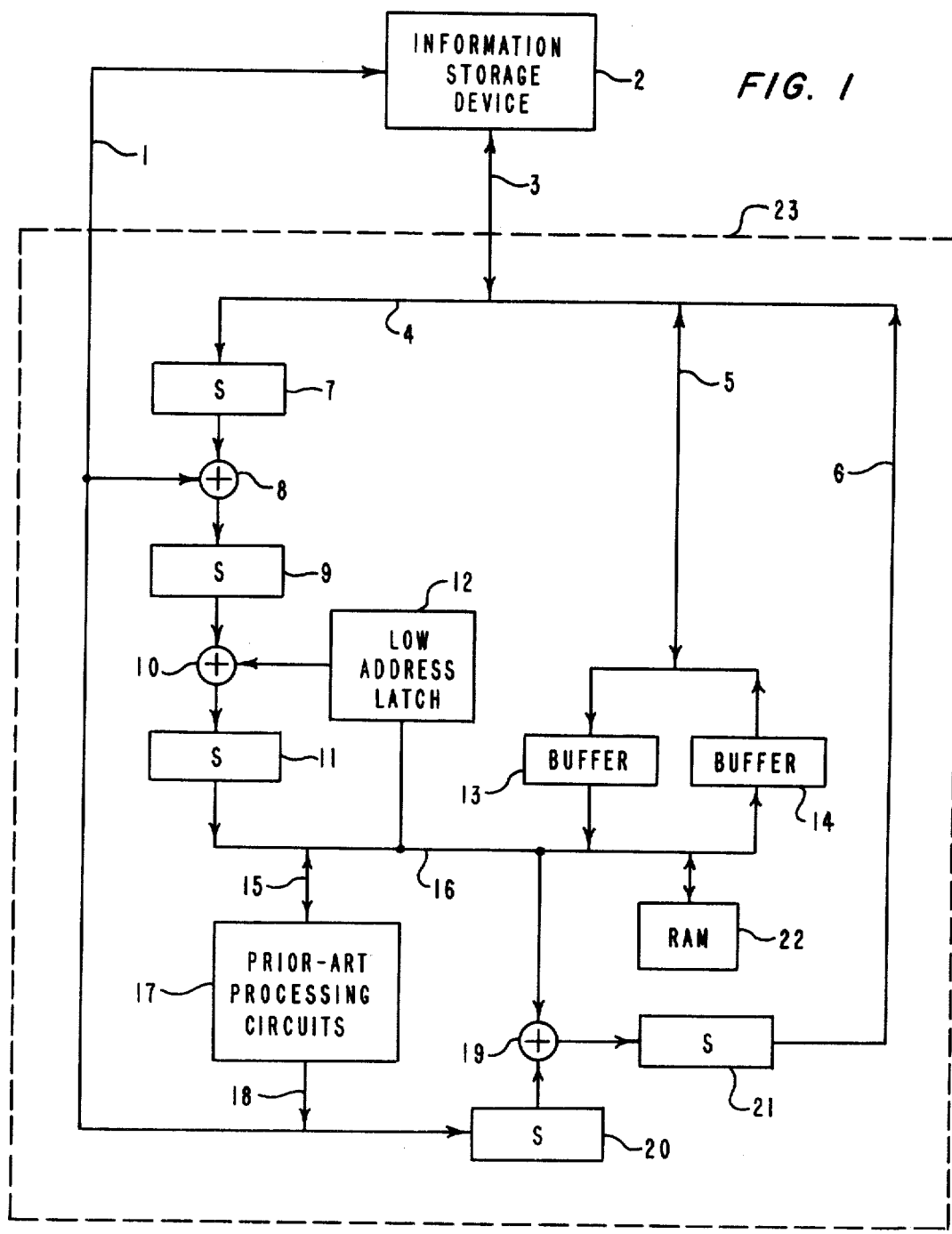
FIG. 1 illustrates the present invention as an encapsulated microprocessor chip connected to an external data-storage device containing the enciphered program which the microprocessor deciphers.
Figure 2:
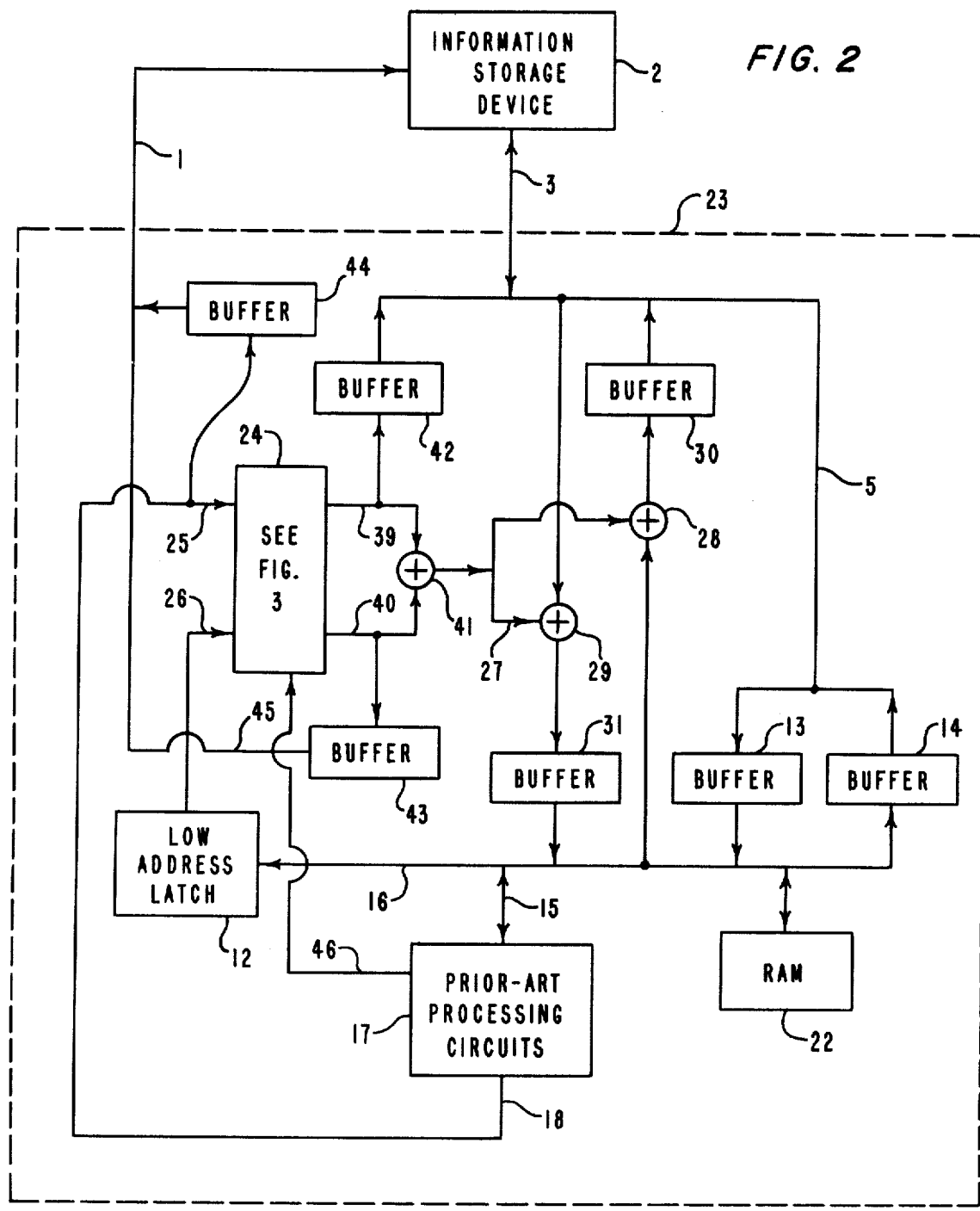
FIG. 2 illustrates a second embodiment which permits enciphering of output data for temporary external storage.

Referring to FIGS. 1 and 2, block 23 is an encapsulated integrated-circuit microprocessor which includes prior-art processing circuit 17, and other circuitry. Processing circuit 17 may include conventional elements such as program counter, registers, accumulator, arithmetic logic unit, input-output circuitry, and a control unit for sequentially executing instructions. For illustration purposes, processing circuit 17 in this disclosure has an 8-bit word-length, and the lines shown in FIGS. 1 and 2 are 8-bit buses. Other bus sizes such as 16-bits may be used instead. Circuit 17 operates in a conventional cyclical sequence: outputting an address on buses 15 and 18 during an address cycle, then inputting an instruction byte on bus 15 in a fetch cycle, then perhaps inputting or outputting data bytes on bus 15 in a data cycle. Such multiplexing of address and data on bus 15 during different cycles is used in this example, but separate address and data buses may be used instead.

In this example the high-order (left half) 8 bits of the 16-bit address generated by circuit 17 appear on bus 18, and the low-order (right half) 8 bits of this 16-bit address appear on bus 15 during the address cycle. Other address sizes may be used, for example a 20-bit address, in which case the manner of multiplexing addresses and data on bus 15 would be changed accordingly. After the 16-bit address (which is divided into two 8-bit bytes in this example) is suitably modified as described below, it emerges from microprocessor 23 on buses 1 and 3 which convey the address to storage device 2. Addressing and fetching of program instructions and data from storage device 2 may be done in the conventional manner. Storage device 2 may be any of a variety of conventional information storage devices, such as solid-state read-only memory, random-access memory, or memory used with sequential media such as disks. Multiple bytes may be fetched before being processed, but in this embodiment information is fetched and processed one byte at a time. Address information on buses 1 and 3 is used by device 2 to locate a byte of information which is output from device 2 on bus 3 during a subsequent cycle. This byte will often be enciphered and will therefore require deciphering within microprocessor 23 as described below, but cleartext may also be stored and accessed from device 2. Other devices (not shown) such as peripheral interface modules and other microprocessors may be attached to buses 1 and 3 as part of a microcomputer system.

The encryption method used for enciphering program bytes and deciphering these bytes in processor 23 is essentially a non-periodic polyalphabetic substitution method, in which each byte is replaced by a substitute byte. The substitution method may be publicly known (several such methods are herein disclosed) but the specific function used in the substitution process is kept secret by the owner of the programs being protected, and is very difficult for an unauthorized person to discover.

The deciphering circuit within microprocessor 23 contains several tables of integers which are used in the substitution process. Each microprocessor 23 unit contains the same integers in these tables, but each table may contain a different arrangement of integers. It is this quasi-random arrangement of integers which is kept secret and may be different for each microprocessor unit. These tables of rearranged integers are stored into each microprocessor when the programs to be protected are enciphered. The enciphering function is the inverse of the deciphering function.

Substitution tables have been used since ancient times and polyalphabetic methods have been used in the prior art to make the table contents difficult to discover. Polyalphabetic substitution ciphers are discussed in all standard texts on cryptography. The main weakness of such ciphers is they are usually periodic, i.e. the same alphabets are used again and again. In the present invention the cipher is not periodic, which prevents a cryptanalyst from using techniques that depend on such periodicity. This elimination of periodicity is accomplished by combining the byte being deciphered with its address, so that the deciphered byte which emerges onto internal bus 16 is a non-linear function of the enciphered cycle on bus 3, the low-address on bus 15 and the high-address on bus 18. A portion (or all) of the address is also enciphered before being output to device 2, so that a cryptanalyst who attempts to discover the contents of the substitution tables used for deciphering, is faced with the problem of first breaking the address cipher. To break either of these two ciphers, the cryptanalyst needs information that is concealed by the other cipher. This mutual cooperation between the two ciphers is one of the strengths of this encryption method.

This encryption method is not unbreakable, either in principle or in practice, but does prevent the cryptanalyst from quickly discovering the encryption function, i.e. the contents of the substitution tables. Instead the cryptanalyst must study each byte of enciphered information and each sequence of enciphered addresses, making inferences about the probable value of each byte, trying various alternatives until he painstakingly reconstructs the original program byte by byte. This effort will take at least as much time as rewriting the program independently. Thus this invention makes breaking the cipher more trouble than the program is worth, and thereby accomplishes its primary objective, which is to deter unauthorized use.

DETAILED DESCRIPTION OF THE FIRST EMBODIMENT

Referring to FIG. 1, a block diagram is shown for one embodiment of the invention. Microprocessor 23 includes processing circuit 17, a deciphering circuit (blocks 7 through 12), an address enciphering circuit (blocks 19 through 21), random-access memory 22, and buffers 13 and 14 which isolate data/address bus 16 which is internal to microprocessor 23 from external data/address bus 3.

During input/output when clear (unenciphered) data is passed via bus 3, either buffer 13 (for input) or buffer 14 (for output) is selected. Internal bus 16 then becomes an extension of external bus 3 via bus 5. The buffers shown in FIGS. 1 and 2 are 3-state isolation amplifiers (one isolation amplifier for each bit on the buses shown) and need not store information.

During fetching of program instructions and reading of data bytes a non-periodic polyalphabetic substitution method is used to decipher each input byte. This is performed in FIG. 1 by blocks 7 through 12 which apply a cascade of three independent substitutions (S-blocks 7, 9 and 11) alternating with exclusive-OR additions, to the input byte. During the addressing cycle the low-address on internal bus 16 is latched into block 12 for use in subsequent cycles. The input byte on buses 3 and 4 is transformed by S-block 7, and exclusive-ORed in gates 10 with the low-address saved in latch 12, and further transformed in substitution block 11. This substitution cipher is periodic for each 256-byte interval of address space. To make the cipher non-periodic over all of enciphered memory, the high-order address is exclusive-ORed in gates 8 with the transformed byte from block 7. Thus the deciphered byte which finally emerges into the internal bus 16 is a non-linear function of the enciphered byte on bus 3, the low-address in latch 12, and the high-address on bus 18.

The S-blocks may be 256-byte tables in which the integers 000 through 255 have been rearranged in a quasi-random sequence. Or each S-block may consist of two or more small substitution tables, each one handling a fraction of the data byte. By usng multiple small tables the total number of bits needed in the tables is greatly reduced, but the complexity of the circuitry for storing the rearranged numbers into the tables during manufacture is increased. If several small tables are used for each S-block, the bits emerging from the S-blocks should be transposed to mix together the bits contributed by the several tables. These tables would actually be implemented as a network of logic gates, but are shown in FIG. 1 as blocks for clarity.

The arrangement of blocks 7 through 12 shown in FIG. 1 is one of several usable arrangements. Other combinations of transpositions, substitutions, and exclusive-OR may be applied to the input byte and the half-addresses, provided that two or more independent substitutions are used, and provided the transformation is unambiguous.

During the addressing cycle the low-address is emitted from processor 17 via bus 15 to bus 16 from which it enters the address enciphering circuit (blocks 19, 20 and 21). Substitution block 21 transforms the plain address into an enciphered low-address on buses 6 and 3 in which in cooperation with the plain high-address on bus 1, accesses memory 2. The address cipher is made non-periodic by exclusive-ORing the high-address to the low-address in gates 19 after the high-address has been enciphered in substitution block 20. This has the effect of transposing (rearranging) the program bytes all over memory. Although this makes analysis of the enciphered program that much more difficult, the main purpose of the address encryption is to conceal the unenciphered address on bus 16. This unenciphered address, which is saved in latch 12, is used by the deciphering process of blocks 7 through 11. By enciphering this address in blocks 19 through 21, the cryptanalyst is deprived of the values of the addresses he needs for analyzing the contents of blocks 7 through 11. Equivalent variations of this address cipher may be used, such as passing the address through an S-block before it gets to gates 19.

Summarizing the sequence of events during the fetching of a typical instruction, and referring to FIG. 1, a 16-bit address is generated by processing circuit 17 on buses 15 and 18. The high-address (left half of the 16-bit address) on bus 18 is output clear (without enciphering) on bus 1 to memory device 2. The low-address (right half) on bus 15 is latched in buffer 12 via bus 16. The high-address on bus 18 is converted to an enciphered byte by S-block 20 and exclusive-ORed in gates 29 with the low-address from bus 16. The combined byte from gates 19 is further converted to an enciphered address by S-block 20 and output on bus 3 via bus 6. The clear high-address on bus 1 and the enciphered low-address on bus 3 are used by memory device 2 to locate an enciphered instruction byte. During this addressing cycle buffers 13 and 14 and S-block 11 are 3-stated (floating).

In the next clock cycle (instruction fetch) the enciphered instruction byte is input to device 23 from memory 2 via buses 3 and 4 to S-block 7. Buffers 13 and 14 and S-block 21 are 3-stated during this cycle. The enciphered instruction is deciphered by blocks 7 through 11 as previously described. The deciphered instruction passes from block 11 via buses 16 and 15 to processing circuit 17 which executes it in the next clock cycle.

During subsequent cycles, addressing and deciphering of data bytes proceed in a similar manner.

The cascade of 3 independent substitution transformations during deciphering provides 256! cubed different keys, which makes it impossible to try all keys. But the cryptanalyst is not prevented from inferring what certain ciphers in memory 2 represent. For example, bytes which are accessed just prior to the output of plaintext via buffer 14, or just before a jump instruction is executed are easily inferred. But this known plaintext does not help him in breaking the cipher, i.e. discovering the contents of the S-blocks. The cryptanalyst is thus left with the alternative of reconstructing the deciphered program byte by byte, which takes at least as much time and effort as writing a new program from scratch. Thus this invention accomplishes its main objective.

In special situations a simple monoalphabetic substitution function may be used in block 7, so that blocks 8 through 12 may be omitted. A simple substitution table does not provide sufficient security for small byte sizes (like 8 bits), because of the ease with which known plaintext may be used to discover unknown bytes. However if the byte size is 16 bits or more and the program small enough (less than 64K) the "alphabet" is larger than the program itself, and hence a given cipher is unlikely to appear more than a few times (except for zeros and spaces). Although some parts of the program/data are easily discovered, the work required to find a unique solution to the remainder of the program may be greater than rewriting the program. To make such a simple substitution practical, block 7 cannot be a table but should be a block cipher that is secure against known-plaintext attack. A product block cipher using alternating steps of small byte substitutions and bit transpositions is sufficiently secure if at least three substitution steps and two transposition steps are used. The middle substitution step need not be secret, so it may be mask programmed. The substitution tables and transpositions should be constructed as described below in the section on the second embodiment.

It is frequently necessary for a microprocessor to save temporary results in a random-access memory (RAM). To make these temporary results secure from external access, the preferred embodiment of this invention includes a small RAM (block 22) which may be read or written from internal bus 16.

For situations where a small internal RAM is too small, temporary results may be enciphered using the reverse of the deciphering process. Later this information may be read back into microprocessor 23 and deciphered using blocks 7 through 12 in the manner described above. Substitution tables 7, 9 and 11 can be used in reverse if the random arrangement of integers in each table is symmetric. This cipher is less secure, however. Or a parallel set of substitution tables may be used in which the table entries are arranged for the inverse encryption function. These multiple tables require a large amount of space on the chip. Even the decipher-only embodiment of FIG. 1 may require too much chip space. To meet this difficulty a second embodiment is shown in FIG. 2, using much smaller substitution tables (only 512 bits total).

DETAILED DESCRIPTION OF THE SECOND EMBODIMENT

Referring to FIG. 2, the enciphering and deciphering is done by exclusive-ORing a scrambled function of the addresses with the byte to be enciphered or deciphered. This exclusive-ORing is done by gates 28 for enciphering and gates 29 for deciphering. The scrambled address on bus 27 is generated by block 24 by performing an enciphering transformation on the addresses on buses 25 and 26. Buffers 30 and 31 isolate gates 28 and 29 from buses 5 and 16 when cleartext is being transferred through buffers 13 and 14.

Block 24 is also used for enciphering the high and low addresses which are output via buffers 42 and 43 during the addressing cycle. Different ciphers must be used for the addressing cycle and the data cycle. The clear high-address is output via buffer 44 if the high-order bit in the high-address is 1. Only the lower 32K bytes of the address space are enciphered. The upper 32K are used for cleartext input/output and for addressing the internal RAM 22 in this example. It must not be possible to execute unenciphered instructions from the cleartext space, as this would permit unauthorized patching.

Figure 3:
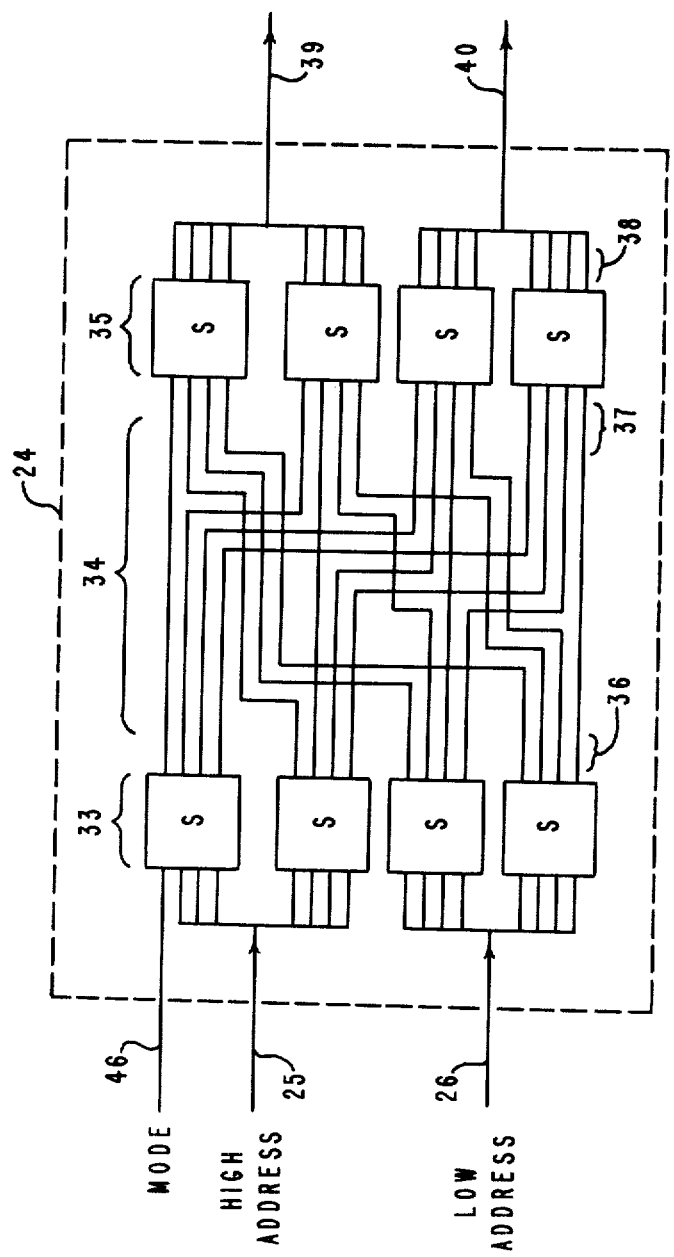
FIG. 3 shows the details of block 24 of FIG. 2.

Referring to FIG. 3 for the details of block 24, the 7 bits of the high-address on bus 25 and the 8 bits of low-address on bus 26 are processed in quadruplets of bits by 4 substitution tables (S-blocks 33). The bits from S-blocks 33 are transposed by transposition block 34 (which may be just crisscrossed connections as shown in FIG. 3), and again substituted in quadruplets by S-blocks 35. Eight bits from two of these S-blocks 35 are exclusive-ored in FIG. 2 gates 41 with the remaining 8 bits from the other S-blocks 35 to form the 8-bit scrambled byte 27 used in blocks 28 and 29.

The eight S-blocks 33 and 35 may each contain the sixteen numbers 0000 through 1111 (binary) rearranged in eight independent quasi-random sequences. This provides an inexhaustible number of permutations. By rearranging the sixteen numbers in each S-block the scrambled address that results in unambiguous. The S-block values may be mask-programmed if all units with a given set of values are used with the same programs. But this will not be economical for many systems. Therefore, to prevent processors from being interchangeable among different programs, all 512 bits in the eight S-blocks should be electrically programmed (PROM). This will permit each unit to use different values if necessary. After a unit has been programmed and verified, the program pulse pin should be disabled by fusing an internal link so that a cryptanalyst will not be able to alter selected bits in the S-blocks or read out the S-block values.

The S-blocks 33 cause each address bit to affect 4 bits on lines 36. The crossed-wire transposition block 34 spreads these four bits to the four S-blocks 35. Thus each bit of address on buses 25 or 26 affects all four S-blocks 35 which affect all 16 bits on buses 39 and 40.

The same value on buses 39 and 40 cannot be used to encipher the high and low address and also encipher a data byte being output via buffer 30, because this would reveal the scrambled address on bus 27. But the same enciphering circuitry (block 24) can be used for both, by including as one of the inputs to an S-block 33 the mode line 46 which is set true by processing circuit 17 during the addressing cycle and false when blocks 27 through 31 are being used.

Summarizing the sequence of events during the fetching of a typical instruction, and referring to FIG. 2, a 16-bit address is generated by processing circuit 17 on buses 15 and 18. The high-order bit is 0 in this example, so the remaining 15 bits are treated as the address of an enciphered byte. The low-address on buses 15 and 16 is latched in buffer 12 and immediately passed via bus 26 to two S-blocks 33 in FIG. 3. The high-address from circuit 17 passes via buses 18 and 25 to the other two S-blocks 33. Since this is an addressing cycle, the mode line 46 is true. The address is scrambled by blocks 33, 34 and 35. The scrambled address passes via bus 39 and 40, through buffers 42 and 43, and emerges from chip 23 on buses 3 and 1. All the other buffers are 3-stated during this address cycle. An enciphered instruction byte is read from read-only memory 2 at the location specified on address buses 1 and 3.

The enciphered instruction is input to chip 23 in the fetch cycle via bus 3. During this fetch cycle the mode line 46 is false which causes S-blocks 35 to generate a different scrambled address on buses 39 and 40 as a function of the unscrambled address still on bus 18 and 25 from circuit 17, and on bus 26 from latch 12. The two halves of the new scrambled address on buses 39 and 40 are exclusive-ORed together by gates 41 to produce the 8-bit scrambled address on bus 27. These bits on bus 27 are exclusive-ORed in gates 29 with the enciphered instruction byte from bus 3 to produce a deciphered instruction which is passed through buffer 31 to buses 16 and 15. Processing circuit 17 obtains this instruction from bus 15 and proceeds to execute it. During subsequent clock cycles, addressing, deciphering, and enciphering proceed in a similar manner.

If the instruction being executed stores a byte into external storage in cipher, the plain address is first enciphered and output on buses 1 and 3 as described above. During the write cycle the plain byte to be stored emerges from circuit 17 on bus 15. Block 24 generates a scrambled address on bus 27 as described above. The scrambled address is exclusive-ORed in gates 28 with the plain data byte on buses 15 and 16, to produce a cipher byte which is passed through buffer 30 to external bus 3 which conveys the cipher byte to external storage device 2.

Control of when each of the buffers is selected, 3-stated or latched is handled by processing circuit 17. The specific logic for controlling these events will be apparent from the description of their function.

There are $16!^8$ possible permutations of the S-block values which is virtually infinite ($3.7 \times 10^{106}$). But the security of this cipher system lies not in the number of permutations, but in the difficulty of determining the contents of the S-blocks given samples of corresponding enciphered and deciphered (plaintext) data, which is easy to obtain, because most programs output plaintext messages. The substitution/transposition/substitution (STS) system in FIG. 3 does not contain enough steps for a secure block cipher, but when it is used to decipher an address being read as part of an instruction, and again used to reencipher this plain address into a scrambled address, the combination is STSSTS which is believed to be very secure. Thus even if a large amount of corresponding cipher/plaintext is discovered which immediately reveals the corresponding scrambled address on bus 27, it cannot be used to derive the contents of the S-blocks. As long as the S-block values remain unknown to the cryptanalyst, the time and effort to reconstruct the program will generally exceed the value of the program.

Each program should use a different microprocessor with different S-block values, so that reconstructing one program does not weaken the security of other programs. Additional security can be achieved by further scrambling the enciphered addresses on buses 39 and 40 by using additional transposing and substitution steps similar to blocks 34 and 35, or by using substitution tables in place of buffers 30 and 31. If such substitution tables were used without exclusive-Oring of scrambled addresses in gates 28 and 29, the result would be simple monoalphabetic substitution whose weaknesses are well known. But by combining such substitution with exclusive-ORing of scrambled addresses, a much more secure non-periodic polyalphabetic substitution cipher results.

The cipher system illustrated in FIG. 3 may be used for scrambling addresses other than 16-bit addresses. For example, addresses of 12 bits may be scrambled by using three S-blocks 33 of four bits each, and using 3-bit inputs to each of the four S-blocks 35. Similarly, addresses of 20 bits may be scrambled by using 5-bit inputs into four S-blocks 33 and using five S-blocks 35 with 4-bit inputs. Addesses of 25 bits may be scrambled by using five 5-bit S-blocks 33 and five 5-bit S-blocks 35. Addresses of 32 bits may be scrambled by using four 8-bit S-blocks 33 and eight 4-bit S-blocks 35. In general, the number of S-blocks 35 should be equal to the number of bits in an out of S-blocks 33, because each bit from a given S-block 33 should be transposed to a different S-block 35 to insure that a change in any one input bit affects all output bits, and to insure the output block is unique for each block of input bits. It is important that all output bits be affected by a change in any one input bit and vice versa so that a cryptanalyst cannot divide the analysis into smaller sub-problems.

An address to be scrambled or a block to be enciphered may be grouped into m sets of n bits each, where m and n are both greater than one. For example, in FIG. 3 m=4 and n=4. The 16 lines entering the four S-blocks 33 are grouped into m=4 sets of n=4 bits. Each such set has a respective substitution table 33 which contains $2^n$ different combinations of n bit integers, arranged in one secret arrangement out of $2^n!$ arrangements. In this example each S-block table 33 contains $2^4 = 16$ different 4-bit integers having one of the possible 16 factorial arrangements or permutations. When a set of n bits is looked up in its table 33, the integer obtained from the table is used as a set of n substitute bits (on lines 36). The m sets of substitute bits 36 are transposed into n groups, so that one bit from each substitute set (from one S-block 33) is transposed (by crossed wires 34) to each group (to one S-block 35). Each group likewise has a respective substitution table (S-blocks 35) which is used to transform the m bits in the group into a group of substitute bits. In this example, 4 bits on lines 37 going to each S-block 35 are transformed to 4 substitute bits on lines 38. These n groups of substitute bits comprise the scrambled address or enciphered block.

The system herein disclosed for a 8-bit processor may be designed around a 12-bit or 16-bit word processor, having a 16-bit, 20-bit, or 24-bit address. In a 16-bit word processor, exclusive-OR gates 41 would not be used. The 16 bits on buses 39 and 40 would all be used in gates 28 and 29. In a 16-bit word processor with a 20-bit address, the low-address and data byte may be multiplexed as 16-bit buses 15, 16, 5, 3, 26, and 39, with a 4-bit high-address on buses 18, 25, 40, 45 and 1. Enough bits of the address shold enter block 24 so that the cipher is non-periodic over the entire enciphered address space.

Figure 4:
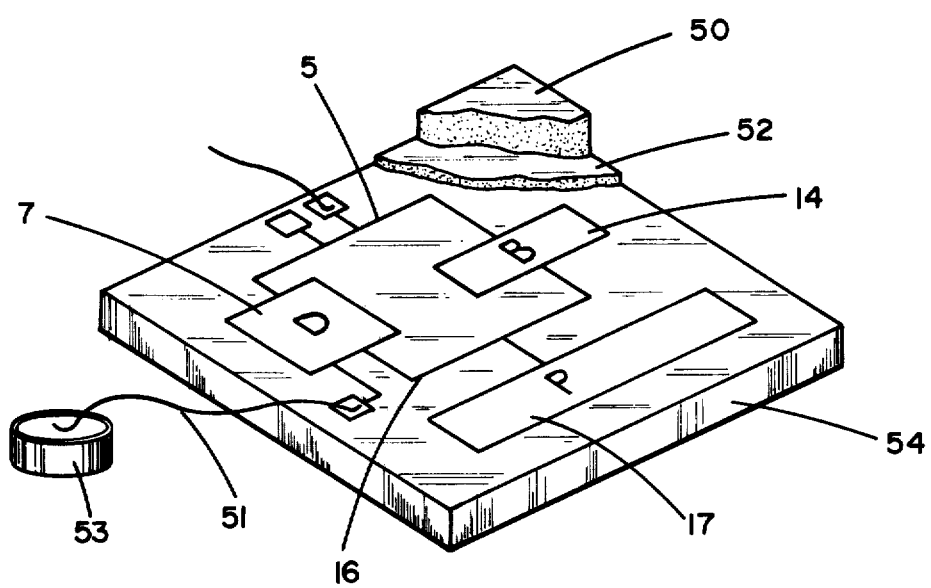
FIG. 4 shows an isometric view of the integrated-circuit chip in schematic form.
Figure 5:
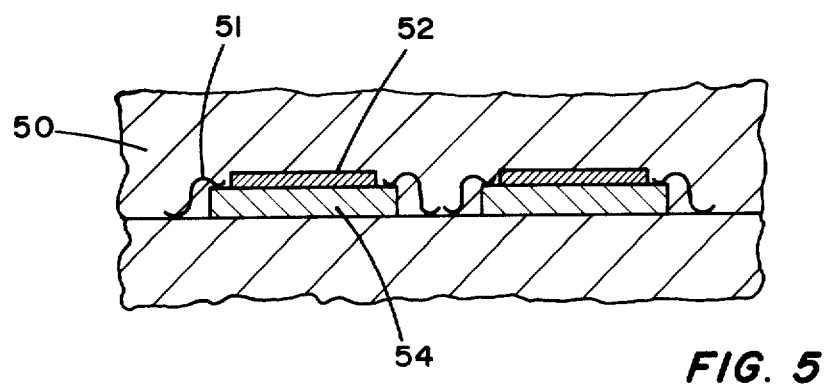
FIG. 5 shows a cross section view of the apparatus embodied as a potted hybrid circuit.

The S-block values and partially processed signals should be electrically inaccessible external to microprocessor 23. Referring to FIGS. 4 and 5, physical security of the chip 54 can be accomplished by coating the chip with a layer 52 of opaque glass, so that on-chip buses are not easily probed, or by staining the chip with an insoluble opaque dye to conceal the circuitry. The chip should also be totally potted with an insoluble or semisoluble resin 50. None of these contrivances provide absolute physical security for the microprocessor, but do make accessing the deciphered program a lot more trouble for an intruder. The degree of difficulty for penetration may be increased to whatever level is justified by the value of the program being protected.

If still more security is desired, some of the S-blocks may consist of volatile random-access memory which is maintained by an external electric battery 53. Any attempt to access the internal buses or circuitry will most likely sever the bonding wire 51 carrying the maintenance current, thereby destroying the S-block values.

In systems with multiple microprocessors, communication between processors can be done in cipher if one processor stores enciphered bytes into an external RAM and a second processor reads them and deciphers them. The intercommunicating processors must be using the same S-block values and assigning the same addresses to these locations. If it is undesirable for all the programs used with the processors to be using the same cipher, then the S-block values may be chosen during manufacture such that for one interval of address space all microprocessors in a system use the same cipher for interprocessor communication, but in the remaining enciphered space the S-block values provide each microprocessor with a unique cipher.

In this disclosure the idea of executing enciphered programs has been emphasized, but the same apparatus and methods may be used for enciphering and deciphering the data used by the program. Even if the entire program can be stored on the microprocessor chip and hence not require enciphering to protect it, the database with which the program operates may be too bulky or changeable to store on the same chip. In such cases the methods and apparatus disclosed herein may be used to protect this data.

I claim the following:

1. A device for processing enciphered information comprising:
    addressing means for generating a digital address;
    means for accepting a portion of enciphered information from storage means at a location selected by said address;
    deciphering means for converting said portion of enciphered information into deciphered information by combining said portion of enciphered information with said address, so as to form a substitute portion of deciphered information; and
    processing means for executing a plurality of computer instructions as a function of said deciphered information.

2. The device of claim 1, wherein said deciphering means comprises:
    first substitution means for transforming said portion of enciphered information into substitute information, said substitution means comprising table means retaining binary numbers arranged in a secret arrangement; and
    gate means for combining the bits of said substitute information with bits of said digital address using modulo-2 addition, thereby forming combined information.

3. The device of claim 2, further comprising second substitution means for transforming said combined information into second substitute information, said second substitution means comprising table means retaining binary numbers arranged in a secret arrangement.

4. The device of claim 2, wherein said gate means combines a first portion of bits of said digital address with said substitute information, and further comprising second gate means for combining said substitute information with a second portion of the bits of said digital address.

5. The device of claim 1, wherein said deciphering means comprises:
    first substitution means for transforming said portion of enciphered information into first substitute information;
    second substitution means for transforming said digital address into second substitute information; and
    gate means for combining said first substitute information with said second substitute information using modulo-2 addition, thereby forming combined information.

6. The device of claim 1, wherein said deciphering means comprises:
    scrambling means for performing a substitution transformation on said digital address, thereby forming a scrambled address; and
    gate means for combining the bits of said scrambled address with bits of said portion of enciphered information using module-2 addition, thereby forming combined information.

7. The device of claim 6, wherein said scrambling means comprises:
    grouping means for grouping the bits of said digital address into m sets;
    first substitution means for transforming said m sets of bits into m sets of substitute bits, said substitution means comprising m tables, each table retaining numbers arranged in a secret arrangement;
    transposition means for regrouping said m sets of substitute bits from said first substitution means into n groups, such that one bit from each set is transposed to each group;
    second substitution means for transforming said n groups of bits into n groups of substitute bits, said substitution means comprising n tables, each table retaining numbers arranged in a secret arrangement; and
    forming means for grouping said n groups of substitute bits from said second substitution means, thereby forming said scrambled address.

8. The device of claim 6, wherein said deciphering means further comprises substitution means for converting said portion of enciphered information into substitute information, said substitution means consisting of table means retaining numbers arranged in a secret arrangement.

9. The device of claim 1 further comprising enciphering means for converting plain information into enciphered information by combining said plain information with said address.

10. A cryptographic apparatus for converting a block of binary information into a product block cipher, said apparatus comprising:
    means for accepting said block of binary information and grouping the bits of said block into m sets of n bits each;
    first substitution means for transforming said m sets of bits into m sets of substitute bits, said substitution means comprising m tables, each table retaining $2^n$ different numbers consisting of n bits each, arranged in said table in one secret arrangement out of $2^n!$ arrangements;

transposition means for regrouping said m sets of n substitute bits from said first substitution means into n groups of m bits each, such that one and only one bit from each set is transposed to each group;

second substitution means for transforming said n groups of bits into n groups of substitute bits, said substitution means comprising n tables, each table retaining $2^m$ different numbers consisting of m bits each, arranged in said table in one secret arrangement out of $2^m!$ arrangements; and forming means for grouping said n groups of m bits from said second substitution means to form said product block cipher.

11. A process for deciphering enciphered information comprising the steps of:

generating a digital address; obtaining a byte of enciphered information from a location specified by said digital address;

combining said byte of enciphered information with said address, thereby forming a substitute byte of deciphered information; and repeating the above steps for each of a plurality of addresses.

12. The process of claim 11, wherein said combining step comprises:

selecting a first subset of bits from said address;
selecting a second subset of bits from said address;
combining said addressed byte of enciphered information with said first address subset, thereby forming a combined byte;
forming a substitute byte as a function of said combined byte; and
combining said substitute byte with said second address subset, thereby forming a deciphered byte.

13. The process of claim 12, wherein said first combining step comprises:

forming a second substitute byte as a function of said addressed byte; and
adding said second substitute byte to said first address subset, using modulo-2 addition.

14. The process of claim 12, wherein said first combining step comprises:

forming a second substitute byte as a function of said first address subset; and
adding said second substitute byte to said addressed byte, using modulo-2 addition.

15. The process of claim 11, wherein said combining step comprises:

selecting a first subset of bits from said address;
selecting a second subset of bits from said address;
forming a first substitute byte as a function of said first address subset;
forming a second substitute byte as a function of said second address subset;
combining said addressed byte of enciphered information with said first substitute byte, thereby forming a combined byte; and
combining said combined byte with said second substitute byte, thereby forming a deciphered byte.

16. The process of claim 11, wherein said combining step comprises:

substituting a scrambled address for said generated address;

adding said scrambled address to said byte of enciphered information using modulo-2 addition, thereby forming a deciphered byte.

17. The process of claim 16, wherein said substituting step comprises the steps of:

grouping the bits of said generated address into a plurality of sets;
substituting one substitute set of bits for each said set, as determined by a secret arrangement of numbers in a substitution table means;
transposing said substitute bits to form a plurality of groups of bits, such that one bit from each said set is transposed to each said group; and
substituting one substitute group of bits for each said group, as determined by a secret arrangement of numbers in a substitution table means, thereby producing a scrambled address.

18. The process of claim 16 further comprising a step of combining a first portion of said scrambled address with a second portion of said address using modulo-2 addition, thereby producing a doubly scrambled address.

19. The process of claim 11 further comprising a step of enciphering said digital address such that said location is a secret function of said digital address.

20. A process for enciphering plain information comprising the steps of:

generating an address for selecting the location where a byte of enciphered information will be stored during a later storing step;
substituting a scrambled address for said generated address;
adding said scrambled address to one byte of said plain information using modulo-2 addition, thereby forming an enciphered byte;
storing said enciphered byte into a storage means at a location selected by said address; and
repeating the above steps for each of a plurality of plain bytes.

21. A process for enciphering a block of binary information comprising the steps of:

grouping the bits of said block into m sets, each set having n bits, where m and n are both greater than one;
substituting for each said set of n bits, one combination of n bits out of $2^n!$ combinations of n bits, as determined by a secret arrangement of said combinations in a substitution table means;
transposing said substitute bits to form n groups of m bits each, such that one and only one bit from each said combination of n bits is transposed to each said group of m bits; and
substituting for each said group of m bits, one combination of m bits out of $2^m!$ combinations of m bits, as determined by a secret arrangement of said combinations in a substitution table means, thereby producing a product block cipher.

22. The process of claim 21 for enciphering a 16-bit number, comprising the steps of:

grouping the bits of said number into four 4-bit sets;
substituting a 4-bit substitution cipher for each said set;
transposing the 16 bits from said four substitution ciphers to form four 4-bit groups, such that each group obtains one and only one bit from each said set; and
substituting a 4-bit substitution cipher for each said group, thereby producing a cipher block of 16 bits.

23. The process of claim 21 for enciphering a 20-bit number, comprising the steps of:
grouping the bits of said number into four 5-bit sets;
substituting a 5-bit substitution cipher for each said set;
transposing the 20 bits from said four substitution ciphers to form five 4-bit groups, such that each group obtains one and only one bit from each said set; and
substituting a 4-bit substitution cipher for each said group, thereby producing a cipher block of 20 bits.

24. The process of claim 21 for enciphering a 25-bit number, comprising the steps of:
grouping the bits of said number into five 5-bit sets;
substituting a 5-bit substitution cipher for each said set;
transposing the 25 bits from said five substitution ciphers to form five 5-bit groups, such that each group obtains one and only one bit from each said set; and
substituting a 5-bit substitution cipher for each said group, thereby producing a cipher block of 25 bits.

25. A microprocessor apparatus for executing a computer program stored in enciphered form as a plurality of bytes of enciphered information, while protecting the deciphered form of the program, wherein each said byte of enciphered information is identified by a digital address, the apparatus comprising:
deciphering means using alternating steps of substitution and exclusive-OR addition for combining a byte of said enciphered information with its corresponding digital address as a function of substitution information so as to produce a byte of deciphered information;
memory means for storing said substitution information during the production of said byte of deciphered information by said deciphering means; and
processing means for fetching a byte of said deciphered information containing at least a portion of an executable instruction, and for executing said executable instruction, and for addressing a successor byte of enciphered information, said processing means being operative to produce output information from which less than a significant part of said program in deciphered form can be obtained.

26. The apparatus of claim 25, further comprising protective body means of rigid material intimately surrounding said deciphering means, said memory means, and said processing means, for deterring access by anyone to said deciphering means, memory means, and processing means.

27. The apparatus of claim 26, wherein said memory means comprises volatile memory means continuously powered by electrical supply means through a power conductor embedded in said rigid material, wherein damage to said rigid material opens said power conductor and results in erasure of said substitution information.

28. The apparatus of claim 26, wherein said deciphering means, said memory means, and said processing means are constructed as an integrated circuit on a chip of semiconductor material, wherein said chip of semiconductor material comprises a portion of said rigid material, and wherein a second portion of said rigid material consists of opaque glass covering said integrated circuit.

29. The apparatus of claim 26, wherein said deciphering means, said memory means, and said processing means are constructed as a hybrid integrated circuit on chips of semiconductor material, wherein said rigid material includes potting resin in which said hybrid integrated circuit is embedded.

30. A microprocessor apparatus for executing a computer program stored in enciphered form as a plurality of bytes of enciphered information, while protecting the deciphered form of the program, wherein each said byte of enciphered information is identified by a digital address, the apparatus comprising:
scrambling means for performing a substitution transformation on the digital address of a byte of said enciphered information, so as to produce a scrambled address;
means for deciphering said byte of enciphered information by combining said scrambled address with said byte of enciphered information so as to produce a byte of deciphered information; and
processing means for fetching a byte of said deciphered information containing at least a portion of an executable instruction, for executing said executable instruction, and for addressing a successor byte of enciphered information, said processing means being operative to produce output information from which less than a significant part of said program in deciphered form can be obtained.

31. The apparatus of claim 30, further comprising protective body means of rigid material intimately surrounding said scrambling means, said deciphering means, and said processing means, for deterring access by anyone to said scrambling means, deciphering means, and processing means.

32. The apparatus of claim 31, wherein the operation of said scrambling means is a function of substitution information, wherein said apparatus further comprises volatile memory means for storing said substitution information during the production of said scrambled address, and wherein said protective body means intimately surrounds said volatile memory means in addition to said scrambling means, said deciphering means and said processing means.

33. The apparatus of claim 30, wherein said scrambling means comprises substitution table means retaining binary integers arranged in a secret arrangement, wherein a portion of said scrambled address is obtained from said substitution table means by table lookup of a portion of said digital address.

34. The apparatus of claim 30, wherein said scrambling means comprises:
grouping means for grouping the bits of said digital address into m sets;
first substitution means for transforming said m sets of bits into m sets of substitute bits, said substitution means comprising m tables, each table retaining integers arranged in a secret arrangement;
transposition means for regrouping said m sets of substitute bits from said first substitution means into n groups, such that one bit from each set is transposed to each group;
second substitution means for transforming said n groups of bits into n groups of substitute bits, said substitution means comprising n tables, each table retaining integers arranged in a secret arrangement; and
forming means for grouping said n groups of bits from said second substitution means, thereby forming said scrambled address.

35. The apparatus of claim 30, wherein said deciphering means comprises exclusive-OR means for combining said scrambled address with said byte of enciphered information using modulo-2 addition.

36. The apparatus of claim 30, wherein said deciphering means further comprises substitution table means for converting said byte of enciphered information into substitute information.

37. A microprocessor apparatus for executing a computer program stored in enciphered form as a plurality of bytes of enciphered information, while protecting the deciphered form of the program, wherein each said byte of enciphered information is identified by a digital address, the apparatus comprising:
- memory means for storing a plurality of bytes of information;
- deciphering means for combining a byte of enciphered information obtained from said memory means with its corresponding digital address so as to produce a byte of deciphered information;
- processing means for fetching a byte of said deciphered information containing at least a portion of an executable instruction, for executing said executable instruction, and for addressing a successor byte of enciphered information, said processing means being operative to produce output information from which less than a significant part of said program in deciphered form can be obtained; and
- protective body means of rigid material intimately surrounding said deciphering means, said memory means, and said processing means, for deterring access by anyone to said deciphering means, memory means, and processing means.

38. The apparatus of claim 37, wherein the operation of said deciphering means is a function of substitution information, wherein said apparatus further comprises volatile storage means for storing said substitution information during the production of said deciphered information, and wherein said protective body means intimately surrounds said volatile storage means in addition to said memory means, said deciphering means and said processing means.

39. A microprocessor apparatus for providing restricted access to data information available to the apparatus in enciphered form, while controlling the amount of the data information output by the apparatus in deciphered form, wherein each byte of said enciphered data information is identified by a digital address, the apparatus comprising:
- deciphering means for combining a byte of enciphered information with its corresponding digital address so as to produce a byte of deciphered information;
- processing means for fetching and executing a plurality of executable instructions, and for addressing portions of enciphered information responsive to said instructions, so as to restrict the portions of enciphered information which are deciphered by said deciphering means, and for producing output information from said byte of deciphered information; and
- protective body means of rigid material intimately surrounding said deciphering means and said processing means, for deterring access by anyone to said deciphering means, processing means, and executable instructions.

40. A cryptographic microprocessor constructed as an integrated circuit chip comprising:
- substitution table means included in said chip for cryptographically transforming a byte of an enciphered program of executable instructions obtained from a storage means location to produce a byte of deciphered information;
- processing means included in said chip for fetching a byte of said deciphered information containing at least a portion of an executable instruction in said program, and for executing said executable instruction, and for fetching a byte of said deciphered information containing at least a portion of a storage means address, and for addressing a location in said storage means specified by the storage means address to select a byte of said enciphered program for transforming by said table means, the processing means being operative to produce output information;
- external bus means for conveying said output information to a location externally of the microprocessor; and
- internal bus means included in said chip for conveying said instruction portion and said address portion from said substitution table means to said processing means, the internal bus means being selectively isolated from said external bus means so as to prevent external access through said external bus means to portions of said deciphered information.

41. A cryptographic microprocessor for executing a computer program stored in enciphered form as a plurality of portions of enciphered information, while protecting the deciphered form of the program, the apparatus comprising:
- first substitution means comprising m tables of integers, the integers in each table having a predetermined permutation, for transforming m portions of said enciphered information into m sets of substitute bits, wherein m is greater than one;
- transposition means for regrouping said m sets of substitute bits into n groups of bits and for transposing one bit from each set to each group, wherein n is greater than one;
- second substitution means comprising n tables of integers, the integers in each table having a predetermined permutation, for transforming said n groups of bits into n groups of substitute bits, wherein said n groups of substitute bits comprise a portion of deciphered information;
- processing means for fetching a byte of said deciphered information containing at least a portion of an executable instruction, and for executing said executable instruction, and for fetching a byte of said deciphered information containing at least a portion of a storage means address, the processing means being operative to produce output information; and
- external bus means for conveying said output information externally of the microprocessor.

42. The microprocessor of claim 41, further comprising:
- internal bus means for conveying said instruction portion and said address portion from said second substitution means to said processing means, the internal bus means being selectively isolated from said external bus means so as to prevent external access via said external bus means to portions of said deciphered information.

43. The microprocessor of claim 41, further comprising:

internal bus means for conveying said instruction portion and said address portion from said second substitution means to said processing means; and buffer means connected to receive said output information from said processing means, and connected to said external bus means, and operating under control of said processing means in either an output state or an isolation state, and for conveying said output information to said external bus means during said output state, and for substantially isolating said internal bus means from said external bus means during said isolation state, said processing means effecting the isolation state of the buffer means during said fetching of a byte of said deciphered information via said internal bus means, thereby preventing external access via said external bus means to said computer program in deciphered form.

44. The microprocessor of claim 41, further comprising memory means for storing said portions of enciphered information.

45. The microprocessor of claim 41, further comprising enciphering means for transforming a portion of unenciphered information into a portion of enciphered information.

46. A cryptographic microprocessor for providing limited access to data information available to the apparatus in enciphered form, while controlling the amount of the data information output by the apparatus in deciphered form, the apparatus comprising:

first substitution means comprising m tables of integers, the integers in each table having a predetermined permutation, for transforming portions of said enciphered information into m sets of substitute bits, wherein m is greater than one;

transposition means for regrouping said m sets of substitute bits into n groups of bits and for transposing one bit from each set to each group, wherein n is greater than one;

second substitution means comprising n tables of integers, the integers in each table having a predetermined permutation, for transforming said n groups of bits into n groups of substitute bits, wherein said n groups of substitute bits comprise a portion of deciphered information;

processing means for fetching and executing a plurality of executable instructions, and for addressing portions of said enciphered information responsive to said instructions, and for producing output information from said portion of deciphered information;

external bus means for conveying said output information externally of the apparatus; and internal bus means selectively isolated from said external bus means, for conveying said portion of decipered information from said second substitution means to said processing means, the isolation between said buses preventing external access via said external bus means to portions of said deciphered information not output by said processing means.

47. The microprocessor of claim 46, further comprising memory means for storing said portions of enciphered information.

48. A cryptographic apparatus for converting a block of binary information into a product block cipher, the apparatus comprising:

first substitution means comprising m tables of integers, the integers in each table having a predetermined permutation, for transforming m portions of said block into m sets of substitute bits, wherein m is greater than one;

transposition means for regrouping said m sets of substitute bits into n groups of bits and for transposing one bit from each set to each group, wherein n is greater than one; and second substitution means comprising n tables of integers, the integers in each table having a predetermined permutation, for transforming said n groups of bits into n groups of substitute bits, wherein said n groups of substitute bits comprise said product block cipher.

49. A cryptographic microprocessor apparatus constructed as an integrated circuit chip for executing a computer program of instructions stored in enciphered form in a storage means as a plurality of bytes of enciphered program information, the apparatus comprising:

deciphering means included in said chip for cryptographically transforming a portion of said enciphered program information obtained from a storage means location to produce a portion of deciphered information;

processing means included in said chip for fetching a byte of said deciphered information containing at least a portion of an executable instruction in said program, and for executing said executable instruction, and for fetching a byte of said deciphered information containing at least a portion of a storage means address, and for addressing a location in said storage means specified by the storage means address to select a portion of said enciphered program information for transforming by said deciphering means, the processing means being operative to produce output information;

external bus means for conveying said output information to a location externally of the apparatus; and internal bus means included in said chip for conveying said instruction portion and said address portion from said deciphering means to said processing means, the internal bus means being selectively isolated from said external bus means so as to prevent external access through said external bus means to portions of said deciphered information.

50. A cryptographic microprocessor apparatus constructed as an integrated circuit chip for executing a computer program of instructions stored in enciphered form in a storage means as a plurality of bytes of enciphered program information, the apparatus comprising:

deciphering means included in said chip for cryptographically transforming a portion of said enciphered program information obtained from a storage means location to produce a portion of deciphered information;

processing means included in said chip for fetching a byte of said deciphered information containing at least a portion of an executable instruction in said program, and for executing said executable instruction, and for fetching a byte of said deciphered information containing at least a portion of a storage means address, and for addressing a location in said storage means specified by the storage means address to select a portion of said enciphered program information for transforming by said deciphering means, the processing means being operative to produce output information;

external bus means for conveying said output information to a location externally of the apparatus;

internal bus means included in said chip for conveying said instruction portion and said address portion from said deciphering means to said processing means; and buffer means included in said chip and connected to receive said output information from said processing means, and connected to said external bus means, and operating under control of said processing means in either an output state or an isolation state, and for conveying said output information to said external bus means during said output state, and for substantially isolating said internal bus means for said external bus means during said isolation state, said processing means effecting the isolation state of the buffer means during said fetching of a byte of said deciphered information through said internal bus means, thereby preventing external access through said external bus means to said computer program in deciphered form.

51. A cryptographic microprocessor apparatus for executing a computer program of instructions stored in enciphered form as a plurality of bytes of enciphered program information, the apparatus comprising:

deciphering means for cryptographically transforming a portion of said enciphered program information into a portion of deciphered information;

processing means for fetching a byte of said deciphered information containing at least a portion of an executable instruction, and for executing said executable instruction, and for fetching a byte of said deciphered information containing at least a portion of a storage means address, the processing means being operative to produce output information;

external bus means for conveying said output information to a location externally of the apparatus; and internal bus means for conveying said instruction portion and said address portion from said deciphering means to said processing means, the internal bus means being selectively isolated from said external bus means so as to prevent external access through said external bus means to portions of said deciphered information.

52. A cryptographic microprocessor apparatus for executing a computer program of instructions including executable portions stored in enciphered form as portions of enciphered program information, portions of the program being stored at respective storage means locations, each location having a storage means address, the apparatus comprising:

deciphering means for cryptographically transforming a portion of said enciphered program information from said storage means to produce a portion of deciphered information;

processing means for fetching a byte of said deciphered information containing an executable portion of an instruction in said program, and for executing said instruction, and for fetching a byte containing at least a portion of a specific address in said program, and for addressing in said storage means a location specified by said specific address to select a subsequent portion of said enciphered program information for transforming by said deciphering means; and internal bus means for conveying said executable portion form said deciphering means to said processing means, the internal bus means being isolated from external access during conveying of said executable portion so as to prevent external access to portions of said program in deciphered form.

53. A cryptographic microprocessor apparatus constructed as an integrated circuit chip for executing a computer program of instructions including executable portions and address portions stored in enciphered form as a plurality of bytes of enciphered program information at respective storage means locations, the apparatus comprising:

deciphering means included in said chip for cryptographically transforming a portion of said enciphered program information from said storage means to produce a portion of deciphered information;

processing means included in said chip for fetching a byte of said deciphered information containing an executable portion of an instruction in said program, and for executing said instruction, and for fetching a byte of said deciphered information containing at least a portion of a deciphered address in said program, and for addressing in said storage means a location specified by said deciphered address to select a subsequent portion of said enciphered program information for transforming by said deciphering means; and internal bus means included in said chip for conveying said executable portion and said address portion from said deciphering means to said processing means, the internal bus means being isolated from external access during said conveying so as to prevent external access to portions of said program in deciphered form.

* * * * *